(12) United States Patent
Warke

(10) Patent No.: US 7,260,142 B2
(45) Date of Patent: Aug. 21, 2007

(54) DYNAMIC HYBRID SWITCHING IN A WIRELINE MODEM

(75) Inventor: Nirmal C. Warke, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 821 days.

(21) Appl. No.: 10/213,039

(22) Filed: Aug. 6, 2002

(65) Prior Publication Data

US 2003/0169806 A1    Sep. 11, 2003

Related U.S. Application Data

(60) Provisional application No. 60/362,987, filed on Mar. 7, 2002.

(51) Int. Cl.
   H04B 1/38 (2006.01)
(52) U.S. Cl. ....................................... 375/222
(58) Field of Classification Search ................. 375/222
   See application file for complete search history.

(56) References Cited

U.S. PATENT DOCUMENTS

| | | | |
|---|---|---|---|
| 4,246,582 A | 1/1981 | Kondo et al. | |
| 4,481,622 A | 11/1984 | Cheng et al. | |
| 4,785,465 A | 11/1988 | Lang et al. | |
| 4,805,215 A * | 2/1989 | Miller | 379/406.08 |
| 5,416,776 A | 5/1995 | Panzarella et al. | |
| 5,506,868 A | 4/1996 | Cox et al. | |
| 5,572,517 A | 11/1996 | Safadi | |
| 5,623,514 A * | 4/1997 | Arai | 375/222 |
| 5,696,765 A | 12/1997 | Safadi | |
| 5,764,694 A * | 6/1998 | Rahamim et al. | 375/224 |
| 5,802,169 A | 9/1998 | Frantz et al. | |
| 5,999,540 A | 12/1999 | McGhee | |
| 5,999,565 A | 12/1999 | Locklear, Jr. et al. | |
| 6,021,158 A | 2/2000 | Schurr et al. | |
| 6,101,216 A | 8/2000 | Henderson et al. | |
| 6,160,843 A | 12/2000 | McHale et al. | |
| 6,163,579 A | 12/2000 | Harrington et al. | |
| 6,185,280 B1 * | 2/2001 | Jarboe et al. | 379/3 |
| 6,192,109 B1 | 2/2001 | Amrany et al. | |
| 6,208,732 B1 * | 3/2001 | Moschytz et al. | 379/402 |
| 6,295,343 B1 | 9/2001 | Hjartarson et al. | |
| 6,385,203 B2 | 5/2002 | McHale et al. | |
| 6,385,252 B1 | 5/2002 | Gradl et al. | |
| 6,400,772 B1 | 6/2002 | Chaplik | |

(Continued)

FOREIGN PATENT DOCUMENTS

EP    0691771 A    1/1996

(Continued)

Primary Examiner—Temesghen Ghebretinsae
Assistant Examiner—Juan Alberto Torres
(74) Attorney, Agent, or Firm—Steven A. Shaw; W. James Brady; Frederick J. Telecky, Jr.

(57) ABSTRACT

A method for dynamically switching hybrids during modem initialization to maximize channel capacity and performance includes the steps of evaluating each hybrid in the modem according to a cost function dependent on the quiet receive noise floor and the transmit signal echo, and then selecting the hybrid that results in the minimum value for the cost function. By performing these steps, the best available hybrid is selected in order to maximize channel capacity and hence maximize modem performance.

14 Claims, 2 Drawing Sheets

U.S. PATENT DOCUMENTS

| | | |
|---|---|---|
| 6,483,870 B1 | 11/2002 | Locklear, Jr. et al. |
| 6,724,890 B1 * | 4/2004 | Bareis ........................ 379/394 |
| 6,795,405 B1 * | 9/2004 | Mladenovic et al. ....... 370/286 |
| 6,996,200 B2 * | 2/2006 | Schubert et al. ............ 375/355 |
| 2001/0048716 A1 * | 12/2001 | Gough et al. ............... 375/222 |

FOREIGN PATENT DOCUMENTS

EP      1148683 A      10/2001

* cited by examiner

DYNAMIC HYBRID SWITCHING IN A WIRELINE MODEM

This application claims priority under 35 USC § 119(e)(1) of provisional application Ser. No. 60/362,987, filed Mar. 7, 2002.

TECHNICAL FIELD

This invention relates in general to the field of communications, and more specifically to a method and apparatus for switching multiple hybrids in a wireline modem.

BACKGROUND

A hybrid is an analog electrical network that is part of the Analog Front End (AFE) of a modem (e.g., Digital Subscriber Line (DSL) modem, etc.) and is responsible for the two to four wire conversion, allowing for real-time, full-duplex transmission of 15 signals. A hybrid allows a transmit signal from one pair of the 4-wire side (transmit) to pass directly on to the 2-wire side (subscriber loop) and at the same time suppresses the transmit signal component on the other pair of the 4-wire side (receive). A hybrid is basically an electrical bridge, and can come in different designs such as single-ended and differential hybrids. In FIG. 1 there is shown a block diagram of a typical prior art modem AFE 100.

Ideally, a hybrid should completely suppress the transmit energy on the receive wire pair. However, in reality, since the line impedance changes from one subscriber loop to the next, the hybrid can only be designed to match an "average" loop's impedance. In many cases, with bridge taps, home phone network adapters and other electrical devices attached to the telephone line, loop impedances can differ substantially from this predetermined "average" or nominal value. In cases where the subscriber loop has an impedance different from this predetermined average, the hybrid is mismatched to the line, and the transmit energy can completely dominate the receive signal and therefore the receive performance suffers.

In order to reduce the effect of hybrid mismatch on the modem receive performance, multiple hybrids are often added to a modem in order to allow for selection of a hybrid that will provide the best performance. With multiple hybrid designs, the important task becomes the selection of a hybrid from among the plurality of available hybrids in order to maximize the receive performance.

A typical prior art method for selecting the optimal hybrid is to train up the modem with each hybrid and then choose the hybrid that achieves the maximum data rate. However, this would mean that for each loop the modem needs to be retrained as many times as the number of hybrids before the best hybrid can be selected. This is often unacceptable, as it would dramatically increase the training time for the modem.

As pointed out earlier, the goal of a hybrid is to minimize the transmit energy that gets coupled into the receive path. The transmit signal is the dominant portion of the transmit energy. Hence, other prior art techniques for dynamically choosing the best hybrid during modem training attempt to minimize the total echo energy due to the transmit signal in the receive path. This can be done by switching in the different hybrids during an appropriate segment of modem initialization, measuring the corresponding total echo energies, and then choosing the hybrid that gives the minimum energy. Unfortunately, this approach is not guaranteed to give the optimal hybrid in terms of maximum data rate performance. A need exists in the art for a method for dynamically switching a hybrid in a modem during modem initialization in order to maximize channel capacity and hence maximize performance.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
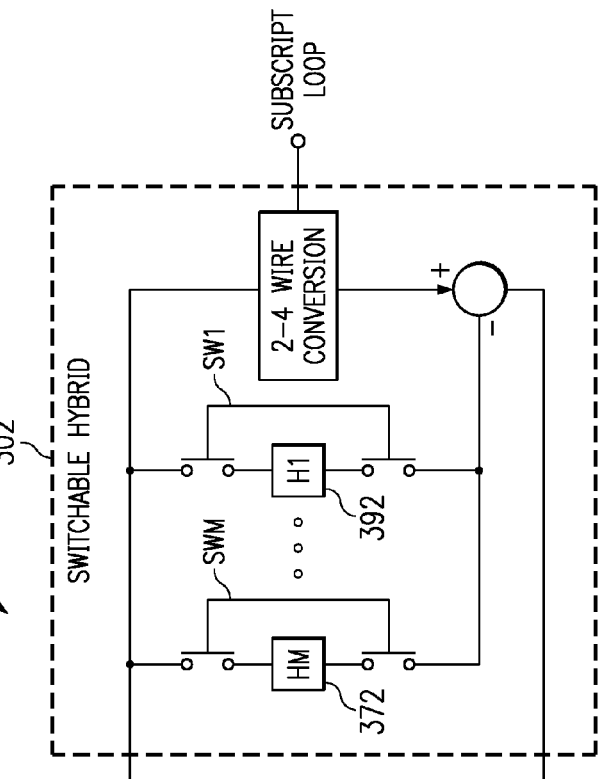
FIG. 1 shows a block diagram of a typical modem AFE including the hybrid.

While the specification concludes with claims defining the features of the invention that are regarded as novel, it is believed that the invention will be better understood from a consideration of the following description in conjunction with the drawing figures.

In the present invention, the method for dynamically switching the hybrid is based on a measure that is directly coupled to the channel capacity. The channel capacity (C) formula for Discrete MultiTone (DMT) systems is:

$$C = \sum_i \log_2\left(1 + \frac{SNR(i)}{\text{Gap}}\right)$$

Where: SNR(i) is the receive Signal-to-Noise Ratio measured over subchannel-I using conventional methods; "Gap" is a constant dependent on the desired error probability, noise margin and coding gain; and the summation is over all the receive subchannels. Based on the minimum number of bits that can be loaded on to a subcarrier there is a minimum SNR (SNR_T) for loading bits. For example, in ADSL modems, a minimum of 2 bits can be used on any subcarrier for carrying data. If a subchannel does not permit at least 2 bits to be loaded, it must not be used for data transmission. Hence, in the channel capacity formula above, the summation above can be reduced to be only over all subcarriers that are capable of transmitting data (S={i: SNR(i)>SNR_T}), and the equation is modified as follows:

$$C = \sum_{i \in S} \log_2\left(1 + \frac{SNR(i)}{\text{Gap}}\right)$$

The "1+" term in the log2 function above can be ignored, as the SNR(i) is typically quite large for all the data carrying subchannels. Given this, the equation is simplified as follows:

$$C \sim \sum_{i \in S} \log_2\left(\frac{SNR(i)}{Gap}\right)$$

Now, SNR(i)=signal(i)/noise(i) over subchannel-i, hence, $$C \sim \sum_{i \in S} [\log_2(\text{signal}(i)) - \log_2(\text{noise}(i)) - \log_2(\text{Gap})] =$$

$$\sum_{i \in S} \log_2(\text{signal}(i)) - \sum_{i \in S} \log_2(\text{noise}(i)) - \sum_{i \in S} \log_2(\text{Gap}) =$$

$$\sum_{i \in S} \log_2(\text{signal}(i)) - \sum_{i \in S} \log_2(\text{noise}(i)) - K$$

The noise term in the above channel capacity equation consists of 3 different components: (1) Inter-Symbol Interference (ISI) and Inter-Channel Interference (ICI) due to imperfect channel shortening; (2) transmit signal echo; and (3) total quiet receive noise floor (ie, no transmit/receive signal present).

Since the receive channel response does not typically change with the different hybrids (note that the job of the hybrid is to subtract out the echo signal component from the receive path), hence the signal term in the channel capacity formula does not depend on the hybrid (constant across different hybrids). Further, the ISI/ICI component of the noise is also a function of the channel response, and hence does not depend on the hybrid. The total quiet receive noise floor on the other hand, includes both the modem receive path noise, plus the noise out of the transmit path. If the quiet receive noise floor is denoted by "nf_quiet(i)" and the transmit signal echo by "nf_echo(i)", the channel capacity (C) is proportional to, $$C \sim L - \sum_{i \in S} \log_2(\text{nf\_quiet}(i)) - f(\text{nf\_echo})$$

where "f(nf_echo)" is the effect of the transmit signal echo on the channel capacity.

Preferably, the optimum hybrid from among the available hybrids must be selected before the modem's automatic gain control (AGC) training stage since the choice of the hybrid would affect the AGC settings. The AGC is generally the first component in the modem that is trained. Hence, at this time the full effect of the transmit signal echo on the noise floor cannot be completely determined. For example, some modem components like the receive filters and the time domain equalizer that are trained later in the initialization sequence can help with echo suppression.

Figure 2:
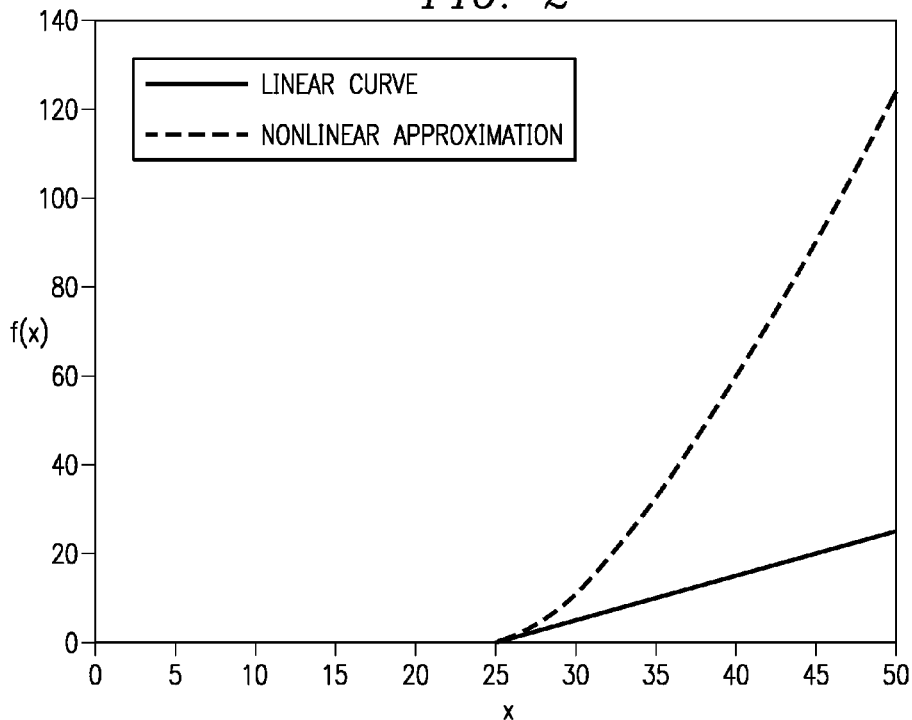
FIG. 2 shows a linear and nonlinear approximation for the effect of relative echo energy on channel capacity.

The echo signal affects receive performance not only over the transmit signal bandwidth but also over the adjacent frequency band due to echo spreading from the receive FFT. As a first order, it can be assumed that if the ratio of the echo energy to the noise floor in the adjacent band is below a certain threshold, for example 25 dB, then there is no effect of the echo spreading on the total noise floor performance. On the other hand, for values above this threshold, echo spreading dominates the receive noise floor in the adjacent band. Further, as the level of echo energy increases, not only does the echo spreading increase proportionately, but also the number of adjacent subcarriers dominated by echo spreading increases. Therefore the effect of echo energy on the noise floor performance is nonlinear. In FIG. 2, there is shown a nonlinear approximation to "f(nf_echo)" relative to a linear curve.

Dynamic Hybrid Switching

In accordance with the preferred embodiment for dynamically determining the optimum hybrid during modem initialization, the following two steps are performed.

Step 1: The following "cost function" is evaluated for each hybrid in the modem:

$$J = A * \sum_{i \in S} \log_2(\text{nf\_quiet}(i)) + B * f(\text{nf\_echo}),$$

where nf_echo is the transmit echo energy relative to the average noise floor in adjacent receive band or, $$\text{nf\_echo} = \log_2\left(\frac{\sum_{U} \text{nf\_echo}(i)}{\sum_{D} \text{nf\_quiet}(i)}\right)$$

where "U" is the set of transmit subcarriers, "D" is an equal set of adjacent receive subcarriers, and "A" and "B" are scalar factors that appropriately weigh the corresponding noise floor components. As an example, an Frequency Division Duplex (FDD) Asymmetric Digital Subscriber Line (ADSL) Customer Premises Equipment (CPE) modem would transmit in the frequency band [22 kHz-134 kHz] and receive in the band [142 kHz-1104 kHz]. Hence, one choice for U is [22 kHz-134 kHz] and for D is [142 kHz-254 kHz].

Step 2. The hybrid that results in the minimum value for "J" (min J) in the equation above is chosen.

The important task in the above method is to determine the weighting constants "A" and "B" for best performance across all possible loops. A method for doing this in accordance with the preferred embodiment is to:

(1) Determine a set of N representative test loops;
(2) For each test loop estimate the values of $$J1 = \sum_{i \in S} \log_2(\text{nf\_quiet}(i))$$

and J2=f(nf_echo) for each hybrid (assume M hybrids). In order to do this, nf_quiet(i) and nf_echo(i) must be estimated. This can be done by averaging the square of the received noise floor with no receive and no transmit signal for nf_quiet and with a transmit signal for nf_echo over the corresponding subchannels;

(3) For each test loop#k determine the modem connect rate R(n,k) with each hybrid#n. Based on the connect rate, determine the best hybrid n0=n0(k) for each test loop.

(4) Let J1(n,k) denote the value of J1 for hybrid#n and test loop#k. Similarly, define J2(n,k) as the value of J2 for hybrid#n and test loop#k;

(5) Form the following cost function:

$$H(A, B) = \sum_k \sum_{n! = n0} \text{Sign}[J(n, k) - J(n0, k)] * (R(n0, k) - R(n, k)) =$$

$$\sum_k \sum_{n! = n0} \text{Sign}[A * (J1(n, k) - J1(n0, k)) + B * (J2(n, k) - J2(n0, k))] *$$

$$(R(n0, k) - R(n, k)) = \text{Sign}(A) *$$

$$\sum_k \sum_{n! = n0} \text{Sign}[(J1(n, k) - J1(n0, k)) + C * (J2(n, k) - J2(n0, k))] *$$

$$(R(n0, k) - R(n, k))$$

where only the sign of A is important and C=B/A;

(6) We want to find "A=+/−1" and "C=real number" to maximize the value of H(A,C). Each term in the above maximization is weighted by the difference in data rate. This guarantees that incorrect decisions that result in a substantially lower data rate from the optimal are minimized; and (7) For each of the above terms $$C = C(n, k) = -\frac{(J1(n, k) - J1(n0, k))}{(J2(n, k) - J2(n0, k))}$$

will result in that term equal to zero. Hence, sorting the values C(n,k) for all n and k will give (M−1)*N sorted values or (M−1)*N+1 intervals over which the value of the above cost function H is constant (since H is dependent only on the sign of the terms). Evaluate the value of H over each of the (M−1)*N+1 intervals and choose the interval that gives the maximum of the absolute value of H. Then A=(Sign of H) and C=(the mid-point) for the corresponding interval.

Figure 3:
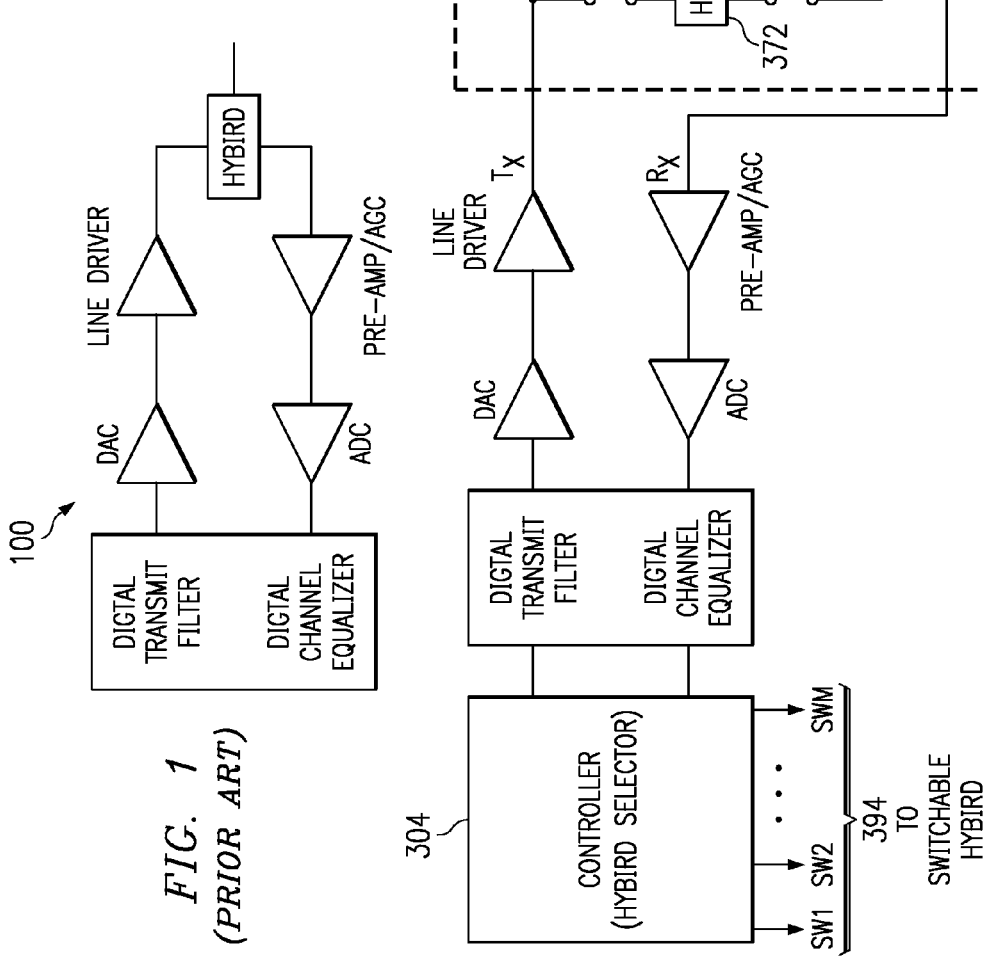
FIG. 3 shows a block diagram of a modem in accordance with the invention.

In FIG. 3, there is shown a modem 300 having a switchable hybrid section 302 including plurality of selectable hybrids 372 to 392 (Hybrids H1 to HM). The number of hybrids 372 to 392 that can reside in switchable hybrid section 302 will depend on the particular design requirements for the modem 300. A hybrid selector 304, selects the best hybrid one of 372 to 392 to use during modem initialization using the hybrid selection algorithm described above. The hybrid selector 304 can take the form of a controller such as a microprocessor, digital signal processor, or other combination of hardware and/or software that can perform the hybrid switching routine of the present invention. The hybrid selector 304 includes an output 394, which provides a hybrid selection signal that causes the selected hybrid one of 372 to 392 to be switched into the circuit and the other hybrids to be deselected.

Figure 4:
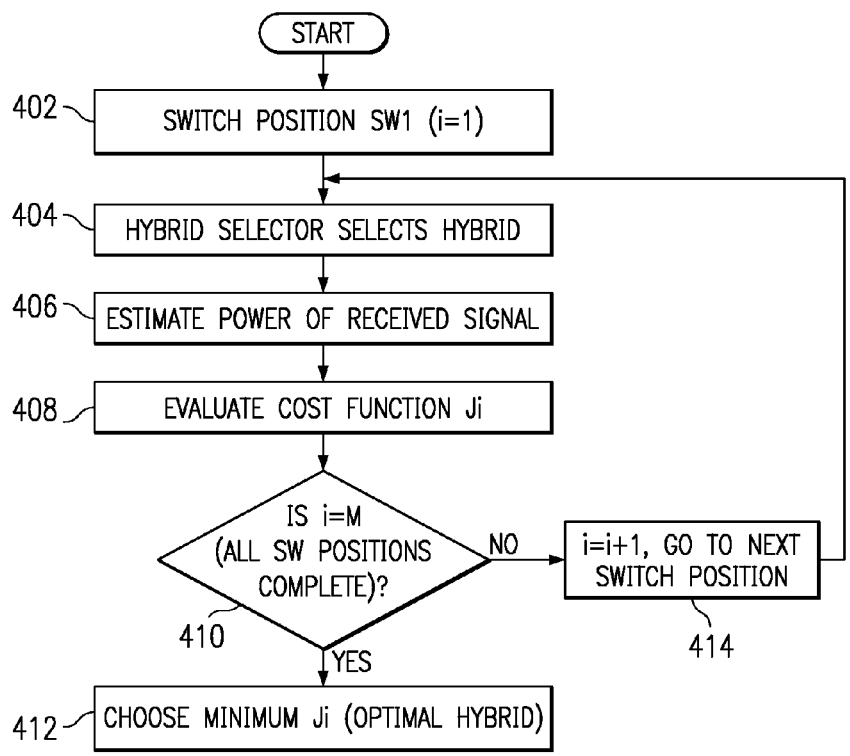
FIG. 4 shows a flowchart highlighting the steps taken in the preferred embodiment of the invention.

Referring now to FIG. 4, there is shown a flow chart highlighting the steps taken for selecting a hybrid 372 to 392 in accordance with the preferred embodiment. In step 402, the hybrid selector 304 selects the first hybrid (hybrid 1, H1) 392 by engaging switch SW1. In step 406, the power of the received signal is estimated and both nf-quiet and nf-echo are determined. In step 408, the cost function (equation $J_1$) for this first hybrid 392 is determined. In decision step 410, it is determined if all of the hybrids (M) in the modem have been evaluated, if not, the routine moves to step 414 which increments the hybrid pointer (i) and in step 404 the next hybrid switch is engaged in order to evaluate the next hybrid (e.g., hybrid 2). The routine repeats until it is determined in decision step 410 that all the hybrids (up to the last hybrid, HM) have been evaluated. Once it is determined that all hybrids 372 to 392 have been evaluated, the routine moves to step 412. In step 412, the hybrid with the minimum value for function J is chosen as the optimal hybrid to be used by the modem 300, and that hybrid is switched into the circuit.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for selecting an optimal hybrid in a modem having a plurality of hybrids, comprising:
  evaluating a cost function that is a function of both echo signal power and receive noise floor for each of the plurality of hybrids, wherein the cost function is given by, $$J = A * \sum_{i \in S} \log_2(\text{nf\_quiet}(i)) + B * f(\text{nf\_echo}),$$

where nf_echo is the transmit echo energy relative to the average noise floor in an adjacent receive band, nf_quiet is the quiet receive noise floor, and "A" and "B" are scalar factors that appropriately weigh the corresponding noise floor components;
  selecting the hybrid from among the plurality of hybrids that results in the minimum value for the cost function;
  switching the selected hybrid into a circuit to be used by the modem.

2. A method as defined in claim 1, wherein $$\text{nf\_echo} = \log_2 \left( \frac{\sum_U \text{nf\_echo}(i)}{\sum_D \text{nf\_quiet}(i)} \right)$$

where "U" is a set of transmit subcarriers, and "D" is an equal set of adjacent receive subcarriers.

3. A method as defined in claim 1, wherein evaluating is performed during the initialization of the modem.

4. A method as defined in claim 2, wherein the scalar factors A and B are determined over a set of representative test loops.

5. A method as defined in claim 4, wherein for each test loop the quiet receive noise floor, nf_quiet(i), and the transmit signal echo nf_echo(i), are estimated by averaging the square of a received Fast Fourier Transform (FFT) buffer with no receive and no transmit signal for nf_quiet(i) and with a transmit signal present for nf_echo(i) over each corresponding subchannels.

6. A method as defined in claim 4, wherein the scalar factors A and B are determined to maximize the weighted probability of a correct decision in choosing the optimal hybrid for each representative test loop with the weighting being determined by the difference in modem connect rates between a particular hybrid and the optimal hybrid for that test loop.

7. A method as defined in claim 4, wherein for each of the representative test loops, the best hybrid for each test loop is determined by determining the hybrid from among the plurality of hybrids that provides the best connect rate for the modem.

8. A modem, comprising:

a plurality of hybrids; and a hybrid selector coupled to the plurality of hybrids for selecting one of the hybrids from among the plurality based on evaluating a cost function (J), which is a function of echo signal power and receive noise floor for each of the plurality of hybrids and choosing the hybrid that provides a minimum value of J, where the cost function (J) is given by:

$$J = A * \sum_{i \in S} \log_2(\mathrm{nf\_quiet}(i)) + B * f(\mathrm{nf\_echo}),$$

where nf_echo is the transmit echo energy relative to the average noise floor in an adjacent receive band, nf_quiet is the quiet receive noise floor, and "A" and "B" are scalar factors that appropriately weigh the corresponding noise floor components.

9. A hybrid selector as defined in claim 8, wherein $$\mathrm{nf\_echo} = \log_2\left(\frac{\sum_U \mathrm{nf\_echo}(i)}{\sum_D \mathrm{nf\_quiet}(i)}\right)$$

where "U" is the set of transmit subcarriers, and "D" is an equal set of adjacent receive subcarriers.

10. A modem as defined in claim 8, wherein the hybrid selector makes the hybrid selection during the initialization of the modem.

11. A hybrid selector as defined in claim 8, wherein the scalar factors A and B are determined over a set of representative test loops.

12. A hybrid selector as defined in claim 8, wherein the quiet receive noise floor, nf_quiet(i) and the transmit signal echo nf_echo(i) are determined by averaging the square of the received FFT buffer with no receive and no transmit signal for nf_quiet(i) and with a transmit signal present for nf_echo(i) over each corresponding subchannels.

13. A hybrid selector as defined in claim 8, wherein the scalar factors A and B are determined to maximize the weighted probability of correct decision in choosing the optimal hybrid for each representative test loop with the weighting being determined by the difference in modem connect rates between a particular hybrid and the optimal hybrid for that test loop.

14. A hybrid selector as defined in claim 11, wherein for each of the representative test loops, the optimal hybrid for each test loop is determined by determining the hybrid from among the plurality of hybrids that provides the best connect rate for the modem.

* * * * *